United States Patent
Chefalas et al.

(10) Patent No.: US 9,436,461 B2
(45) Date of Patent: Sep. 6, 2016

(54) REFINING COMPOSITION INSTRUMENTATION FOR SERVICES

(71) Applicant: International Business Machines Corporation, Armonk, NY (US)

(72) Inventors: Thomas E. Chefalas, Somers, NY (US); Chang-Shing Perng, Sunnyvale, CA (US); Anca Sailer, Scarsdale, NY (US); Frank A. Schaffa, Hartsdale, NY (US); Alla Segal, Mount Kisco, NY (US); Ignacio Silva-Lepe, Putnam Valley, NY (US); Tao Tao, Ossining, NY (US); Liangzhao Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/528,193

(22) Filed: Oct. 30, 2014

(65) Prior Publication Data
US 2016/0124745 A1 May 5, 2016

(51) Int. Cl.
*G06F 9/44* (2006.01)
*G06N 5/02* (2006.01)

(52) U.S. Cl.
CPC .................. *G06F 8/71* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 8,214,311 B2 | 7/2012 | Adams | |
| 2003/0131075 A1 | 7/2003 | Bear et al. | |
| 2008/0244527 A1* | 10/2008 | Chang | G06F 8/20 717/127 |
| 2012/0226643 A1 | 9/2012 | Adams | |
| 2013/0232464 A1* | 9/2013 | Jacquin | G06Q 10/06 717/104 |
| 2013/0262923 A1* | 10/2013 | Benson | H04L 67/1097 714/15 |
| 2014/0007041 A1* | 1/2014 | Schmeling | G06F 8/10 717/105 |
| 2014/0130036 A1* | 5/2014 | Gurikar | G06F 8/61 717/176 |
| 2014/0282525 A1* | 9/2014 | Sapuram | G06Q 30/0631 718/1 |
| 2014/0317166 A1* | 10/2014 | Iyoob | G06Q 30/0631 709/201 |
| 2014/0351516 A1* | 11/2014 | Larimore | G06F 9/455 711/121 |

OTHER PUBLICATIONS

"Leveraging Service Composition Relationship to Improve CPU Demand Estimation in SOA Environments", Zhang et al., 2008 IEEE International Conference on Services Computing.*

* cited by examiner

*Primary Examiner* — Daxin Wu
(74) *Attorney, Agent, or Firm* — Edward J. Wixted, III

(57) ABSTRACT

In an approach for creating a service composition, a processor receives a plurality of software modules, wherein each software module performs part of a service requested by one or more users on a network. A processor collects one or more attributes and one or more dependencies for each of the plurality of software modules. A processor appends information about the attributes and the dependencies to each respective software module. A processor stores each of the plurality of software modules with the respective appended information in a database. A processor creates a service composition comprised of a combination of the plurality of software modules, based on the appended information and the service requested by the one or more users on the network.

12 Claims, 4 Drawing Sheets

REFINING COMPOSITION INSTRUMENTATION FOR SERVICES

BACKGROUND OF THE INVENTION

The present invention relates generally to the field of service-orientation, and more particularly to service composition based on degrees of composability, historical (proven) samples, and/or prior services and their custom definition and activity.

Service-orientation is a design paradigm to build computer software in the form of services. Like other design paradigms (e.g., object-orientation), service-orientation provides a governing approach to automate business logic as distributed systems. What distinguishes service-orientation is the service-orientation's set of design principles to ensure the manner in which the service-orientation carries out the separation of concerns in the software. A service-oriented architecture (SOA) is governed by this set of design principles and when applying service-orientation results in units of software partitioned into operational capabilities, each unit is designed to solve an individual concern and qualify as a service.

A service composition is an aggregate of services collectively composed to automate a particular task or business process. To qualify as a composition, at least two participating services plus one composition initiator need to be present. A composition initiator acts as the initial sender of a message path by sending a command or input values to a composition controller. A composition controller represents a service with a capability that is executing the parent composition logic required to compose capabilities within other services. Without at least two participating services and one composition initiator, the service interaction only represents a point-to-point exchange. Service compositions can be classified into primitive and complex variations. In early service-oriented solutions, simple logic was generally implemented via point-to-point exchanges or primitive compositions. As the surrounding technology matured, complex compositions became more common. Much of the service-orientation design paradigm revolves around preparing services for effective participation in numerous complex compositions; so much so that the service composability design principle exists, dedicated to ensuring that services are designed in support of repeatable composition.

SUMMARY

Aspects of an embodiment of the present invention disclose a method, computer program product, and computing system for creating a service composition. A processor receives a plurality of software modules, wherein each software module performs part of a service requested by one or more users on a network. A processor collects one or more attributes and one or more dependencies for each of the plurality of software modules. A processor appends information about the attributes and the dependencies to each respective software module. A processor stores each of the plurality of software modules with the respective appended information in a database. A processor creates a service composition comprised of a combination of the plurality of software modules, based on the appended information and the service requested by the one or more users on the network.

DETAILED DESCRIPTION

In one embodiment, the present invention introduces a methodology to instrument a marketplace for service composition based on degrees of composability and on a dynamic evolution from one level of composability details in the knowledge base to the next level through learning from samples, prior services and their custom composition definition and activity.

The present invention will now be described in detail with reference to the Figures.

Figure 1:
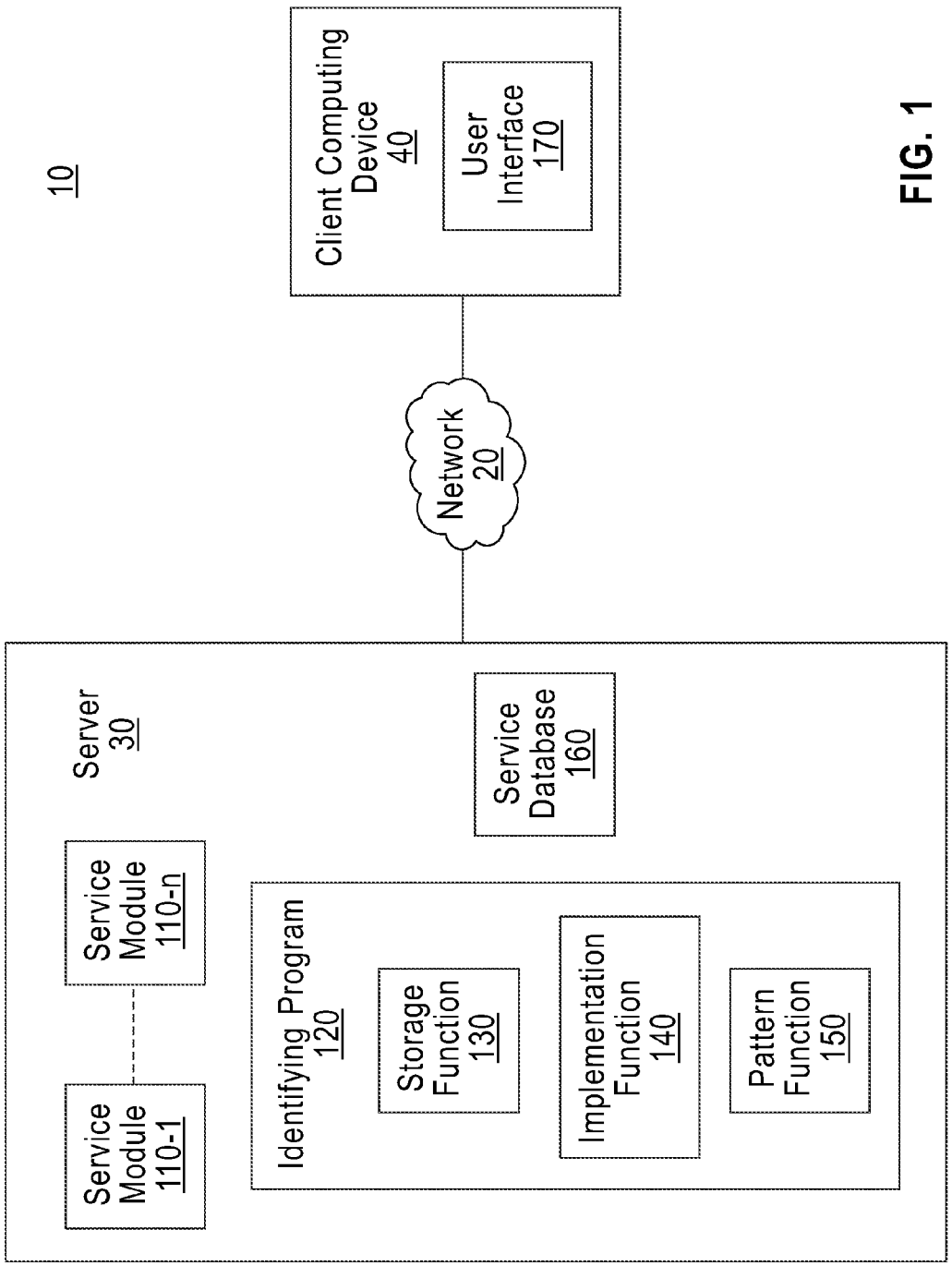
FIG. 1 depicts a block diagram of a computing system, in accordance with an embodiment of the present invention.

FIG. 1 depicts a diagram of computing system 10, in accordance with one embodiment of the present invention. FIG. 1 provides an illustration of one embodiment and does not imply any limitations with regard to the environments in which different embodiments may be implemented.

In the depicted embodiment, service module 110 on server 30 is labeled as "1-n" which signifies one service module 110 or any number (e.g., n-number) of service module 110. Although one service module 110 may be the topic of interest at certain points in the present invention, the present invention will require two or more service module 110. Hereafter, service module 110, when mentioned without "1-n," will signify any one specific service module within the collective service module 110 "1-n" being referenced at the given time. Each service module 110 can perform different functions/services, and each service module 110 is not identical. Additionally, herein, service module and software module are interchangeable.

In the depicted embodiment, computing system 10 includes server 30 and client computing device 40 interconnected over network 20. Network 20 may be a local area network (LAN), a wide area network (WAN) such as the Internet, a cellular data network, any combination thereof, or any combination of connections and protocols that will support communications between server 30 and client computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with client computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. Server 30 contains service module 110, identifying program 120, storage function 130, implementation function 140, pattern function 150, and service database 160. Server 30 may include components, as depicted and described in further detail with respect to FIG. 5.

Client computing device 40 may be a desktop computer, laptop computer, netbook computer, or tablet computer. In general, client computing device 40 may be any electronic device or computing system capable of processing program instructions, sending and receiving data, and communicating with server 30 via network 20. Client computing device 40 contains user interface 170. Client computing device 40 may include components, as depicted and described in further detail with respect to FIG. 5.

User interface 170 may be any user interface used to access information from server 30, such as information gathered and produced by identifying program 120. In some embodiments, user interface 170 may be a generic web browser used to retrieve, present, and traverse information resources from the Internet. In other embodiments, user interface 170 may be a software program or application that enables a user at client computing device 40 to access server 30 over network 20. In the depicted embodiment, user interface 170 resides on client computing device 40. In other embodiments, user interface 170, or similar user interfaces, may reside on other client computing devices capable of accessing server 30 over network 20.

Service module 110 may be any part of a program that contains one or more routines, where the program is composed of one or more independently developed modules that are not combined until the program is linked. Service module 110-1 through service module 110-n can each perform different functions/services. Service module 110 performs part of a service used by one or more users over network 20. In some embodiments, a program (not shown) may allow a program or software developer, administrator, or other user to define and create service module 110 or other similar modules.

Identifying program 120 combines two or more software modules, such as service module 110-1 through service module 110-n, (which perform functions/services) to create a service composition to meet the service needs of one or more users. Additionally, identifying program 120 creates patterns of module use for services within the same category, such that in the future, the pattern will already exist and could be used by a customer, or other user, desiring a similar service. In some embodiments, identifying program 120 resides on server 30. In other embodiments, identifying program 120 may reside on another server or another computing device, provided that identifying program 120 has access to storage function 130, implementation function 140, pattern function 150, and service database 160.

Storage function 130 collects and appends one or more attributes and one or more dependencies for service module 110 and stores results in a database, such as service database 160, for further analysis. Attributes may include one or more of the following: composability with respect to other software modules, sub-functions of the module, module dependency type, and composition type. Composability is a system design principle that deals with the inter-relationships of components. A highly composable system provides recombinant components that can be selected and assembled in various combinations to satisfy user requirements. The essential features that make a component composable are that it be self-contained (modular) and stateless (treat each request as an independent transaction). Module dependency type refers to what other modules or applications are required for, optional for, or can replace the module to perform the module's functions. Composition type refers to how the software modules are to be assembled together (e.g., part of a bigger module, waterfall from one module to another (meaning a series of modules being used right after the other), or a central controlling module interlocking, simultaneously or alternating, with other modules). Dependencies may include, but are not limited to, one or more of the following: pre-deployment condition and/or post-deployment condition; required or optional (composability type, and composability attributes). Pre-deployment condition is the condition of service module 110 before service module 110 is released to a user. Post-deployment condition is the condition of service module 110 after service module 110 is released to a user. Composability type (may be required or optional) is how service module 110-1 through service module 110-n could be assembled to be effective. Composability attributes (may be required or optional) refer to whether or not service module 110 can be combined with, or assembled from, parts, sub-modules, or modules. In the depicted embodiment, storage function 130 is a function of identifying program 120. In other embodiments, storage function 130 may be a separate storage program accessible by identifying program 120.

Implementation function 140 represents the one or more appended attributes and the one or more appended dependencies collected by storage function 130 in a manner to implement service module 110. Implementations may include, for example, obtaining licenses or code certificates for service module 110, placing service module 110 in a process flow, combining service module 110-1 through service module 110-n, or deploying service module 110. In the depicted embodiment, implementation function 140 is a function of identifying program 120. In other embodiments, implementation function 140 may be a separate storage program accessible by identifying program 120.

Pattern function 150 identifies, creates, and stores patterns for various software modules that may be used in conjunction with service module 110. Patterns are created to allow future services in the same category to be handled more quickly and efficiently. For example, a pattern may be the manner in which modules in the same category are composed and deployed. In the depicted embodiment, pattern function 150 is a function of identifying program 120. In other embodiments, pattern function 150 may be a separate storage program accessible by identifying program 120.

Service database 160 may be a repository that may be written to and/or read by identifying program 120, storage function 130, implementation function 140, and pattern function 150. In some embodiments, service database 160 is a database that merely stores information. In other embodiments, service database 160 is a knowledge base that is governed by an ontology. A knowledge base is a technology used to store complex structured and unstructured information used by a computer system. A knowledge-based system consists of a knowledge base that represents facts and an inference engine that can reason about those facts and use rules and other forms of logic to deduce facts or highlight inconsistencies. In some embodiments, information stored in a knowledge base may include: function categories;

descriptions; services; service functions; capabilities and configurations; and WordNet (a lexical database for the English language). An ontology is a formal, explicit specification of a shared abstract simplified view of some selected part of the world, containing the objects, concepts, and other entities that are presumed of interest for some particular purpose and the relationships between them. In some embodiments, an ontology may use the information stored in a knowledge base to form and identify the relationships between different services.

While the depicted embodiment specifies a module, such as service module 110, other embodiments of the present invention may perform similar functionality with regard to an application or program capable of having multiple versions. For example, embodiments of storage function 130 may collect and append one or more attributes and one or more dependencies of an application or program (not shown) on client computing device 40. Based on the one or more attributes and one or more dependencies obtained, an alternate version of implementation function 140 may cause certain activities to be performed on client computing device 40 to be altered. For example, certain licenses and code certificates may be required for the entire application or program before the application or program is deployed, according to similar methods described herein with regard to service module 110 and implementation function 140.

Figures 2, 3:
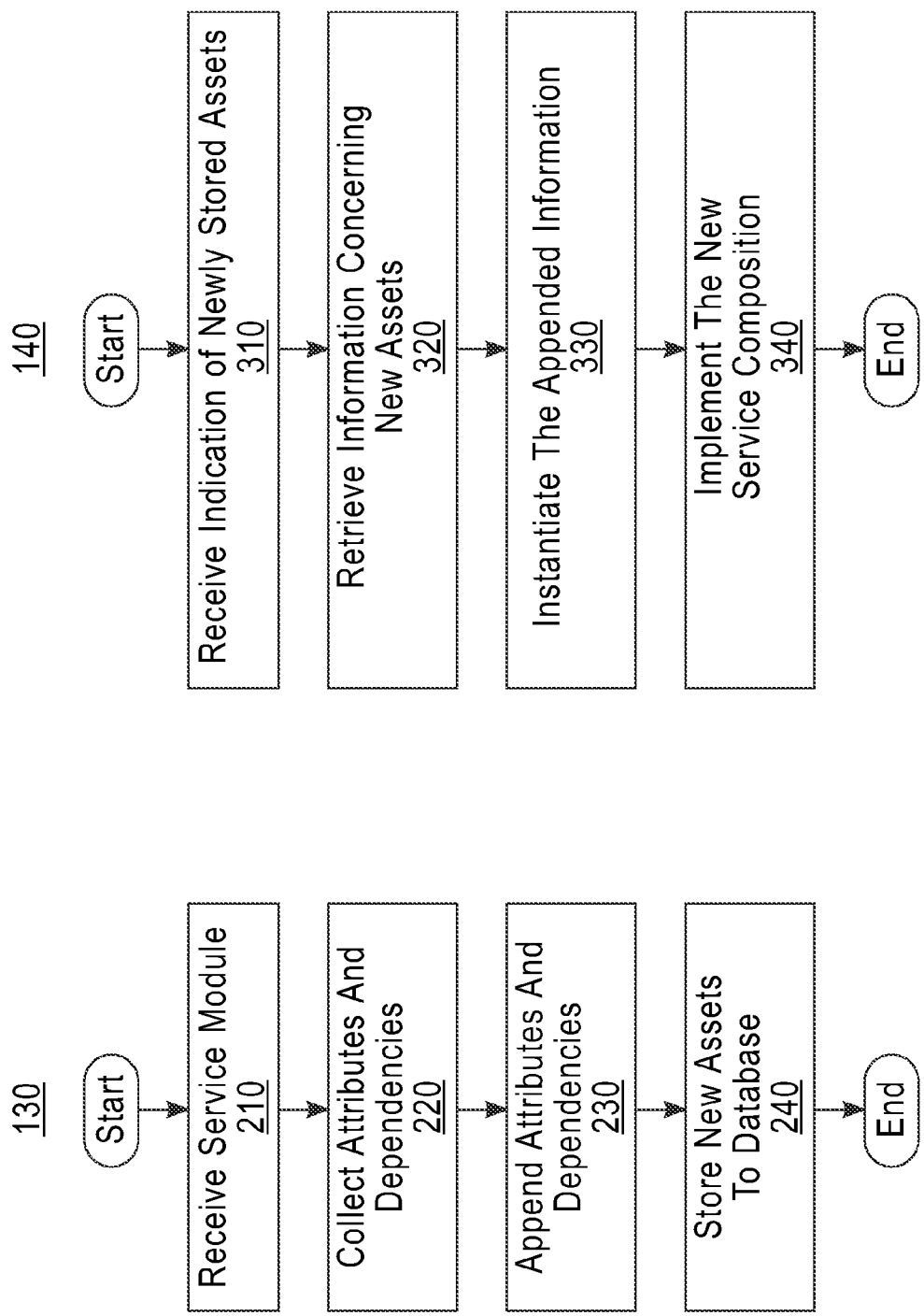
FIG. 2 depicts a flowchart of the steps of a storage function, executing within the computing system of FIG. 1, for collecting and appending one or more attributes and one or more dependencies for modules and storing results in a database for further analysis, in accordance with an embodiment of the present invention.
FIG. 3 depicts a flowchart of the steps of an implementation function, executing within the computing system of FIG. 1, for representing the appended information of FIG. 2 in a manner to perform various activities concerning the modules, in accordance with an embodiment of the present invention.

FIG. 2 depicts a flowchart of the steps of storage function 130, executing within the computing system of FIG. 1, in accordance with an embodiment of the present invention. Storage function 130 collects and appends one or more attributes, also referred to as properties of the service module 110, and one or more dependencies, also referred to as reliances of service module 110, and stores the results to service database 160, for further analysis by implementation function 140 and pattern function 150, in accordance with one embodiment of the present invention. Using a plurality of software modules, storage function 130 can narrow its focus when collecting and appending one or more attributes and one or more dependencies of service module 110.

In one embodiment, initially, a software or program developer, or other user, may create service module 110. In such an embodiment, a software or program developer, or other user, gathers information from service providers and consumers to create a plurality of service module 110. In another embodiment, a software program or application (not shown) may create service module 110. In this embodiment, a software program or application retrieves the information directly from service providers and consumers. The software program or application uses the received information to create a plurality of service module 110 (e.g., service module 110-1 through service module 110-n). While not depicted, it should be noted that service module 110 may be a complete software program or application, rather than a software module. A program or tool similar to identifying program 120 may collect, append, and store one or more attributes and one or more dependencies of service module 110; perform activities concerning service module 110 with new assets; and create and store patterns dealing with service module 110.

In step 210, storage function 130 receives a plurality of software modules, such as service module 110, through one or more interfaces connected to a network. In some embodiments, storage function 130 retrieves service module 110 from a repository, such as service database 160. As previously described, a variety of software modules may be created by a software or program developer, where the software modules perform part of a service used by one or more users on a network. The service being used may be based on factors, such as problems with a website, questions dealing with payroll, legal questions, or other information. For example, a software module may address a legal question that a user may have pertaining to incorporating a business.

In step 220, storage function 130 configures, identifies, and/or collects one or more attributes and one or more dependencies about one or more service module 110. The attributes may include one or more of the following: composability with respect to other software modules, sub-functions of the module, module dependency type, and composition type. Composability is a system design principle that deals with the inter-relationships of components. A highly composable system provides recombinant components that can be selected and assembled in various combinations to satisfy user requirements. The essential features that make a component composable are that it be self-contained (modular) and stateless (treat each request as an independent transaction). Module dependency type refers to what other modules, or applications, are required for, optional for, or can replace the module to perform the module's functions. Composition type refers to how the software modules are to be assembled together (e.g., part of a bigger module, waterfall from one module to another (meaning a series of modules being used right after the other), or a central controlling module interlocking, simultaneously or alternating, with other modules). Dependencies may include, but are not limited to, one or more of the following: pre-deployment condition and post-deployment condition; required or optional (composability type, and composability attributes). Pre-deployment condition is the condition of service module 110 before service module 110 is released to a user. Post-deployment condition is the condition of service module 110 after service module 110 is released to a user. Composability type (may be required or optional) is how service module 110-1 through service module 110-n would have to be assembled to be effective. Composability attributes (may be required or optional) refer to whether or not service module 110 can be combined with, or assembled from, parts, sub-modules, or modules.

In step 230, storage function 130 appends one or more attributes and one or more dependencies to the respective service module 110 to create a new asset. The new asset is a service module 110 with the appended one or more attributes and one or more dependencies. In some embodiments, the appended information can be missing, which means service module 110 has the lowest degree of composability and no dependency. In some embodiments, the appended information is partially provided by storage function 130, meaning there are medium degrees of defined dependency. When the appended information is partially provided, identifying program 120 has to fill in the gaps in the information requested. In other embodiments, the appended information is fully provided, meaning there are higher degrees of defined dependency. When the appended information is fully provided, there are two possibilities: (1) if there are samples of previously composed service module 110-1 through service module 110-n in service database 160 within the same category as the present service module 110 (including appended information), identifying program 120 may use a historical (proven) sample; or (2) if there are no previous, proven samples within a similar category, identifying program 120 may use a shim layer to combine multiple service module 110 based on the appended information. A shim layer, or shims, are used for running programs on different software platforms from which they were developed. The shim layer generates additional code to enable the composition of two or more service module 110-1 through service module 110-n. When the appended information is completely provided with the shim layer, identifying program 120 gives a complete implementation of the composition and only has to deploy the new asset.

In step 240, storage function 130 stores the combined modules as new assets to a repository, such as service database 160. In some embodiments storage function 130 may generate one or more reports that include a collection of modules with their respective one or more attributes and one or more dependencies. In other embodiments, storage function 130 may store information gathered, such as: composability; sub-functions of the module; module dependency type; composition type; pre-deployment condition; post-deployment condition; composability type; composability attributes; and composability flows.

FIG. 3 depicts a flowchart of the steps of implementation function 140, executing within the computing system of FIG. 1, in accordance with an embodiment of the present invention. Implementation function 140 performs activities concerning service module 110, based on one or more appended attributes and one or more appended dependencies gathered by storage function 130, in accordance with one embodiment.

In step 310, implementation function 140 receives an indication that there are new assets stored to service database 160. In some embodiments, the indication is received when each new asset is stored to service database 160. In other embodiments, the indication is received when a predefined number of new assets are stored to service database 160. The indication may include information, such as, but not limited to, the size of service module 110, the size of service module 110 with the appended information, the type of appended information, and various uses of service module 110 with the appended information.

In step 320, implementation function 140 retrieves information concerning service module 110 with appended information (new assets). In one embodiment, implementation function 140 may retrieve information concerning new assets from a repository accessible by implementation function 140, such as service database 160. In another embodiment, implementation function 140 receives information concerning the new assets directly from storage function 130. As previously mentioned, information concerning the new assets may include one or more attributes and one or more dependencies collected and appended by storage function 130. Attributes may include one or more of the following: composability, sub-functions of the module, module dependency type, and composition type. Furthermore, dependencies may include, but not limited to, one or more of the following: pre-deployment condition, post-deployment condition, composability type, composability attributes, and composability flows.

In step 330, implementation function 140 instantiates the appended information. Instantiate means to represent (an abstraction) by a concrete instance (visible form). Therefore, implementation function 140 puts the appended information in a form that can be used by the software or program developers, users, service providers, consumers, and/or identifying program 120. In one embodiment, implementation function 140 instantiates the partially provided appended information. When the appended information is partially provided, identifying program 120 may have to fill in gaps during the composition stage. In another embodiment, implementation function 140 instantiates the completely provided appended information. When the appended information is completely provided, identifying program 120 does not have to fill in gaps during the composition stage.

In step 340, implementation function 140 implements the service composition. There may be many uses for the new asset. Also, there may be tasks to complete before identifying program 120 may use the new asset. In one embodiment, for example, implementation function 140 may have to acquire a code certificate or required licenses for service module 110 with the appended information. When a particular piece of code is needed to complete a task, identifying program 120 may send a notice to the owner of the code, seeking a code certificate or license. In some embodiments, implementation function 140 may combine service module 110-1 through service module 110-n. In another embodiment, for example, implementation function 140 may place service module 110 with the appended information in a process flow, or implementation function 140 may deploy service module 110 with the appended information. In some embodiments, there is a shim implementation support environment or generator that generates additional code to allow two or more modules to operate together.

Figure 4:
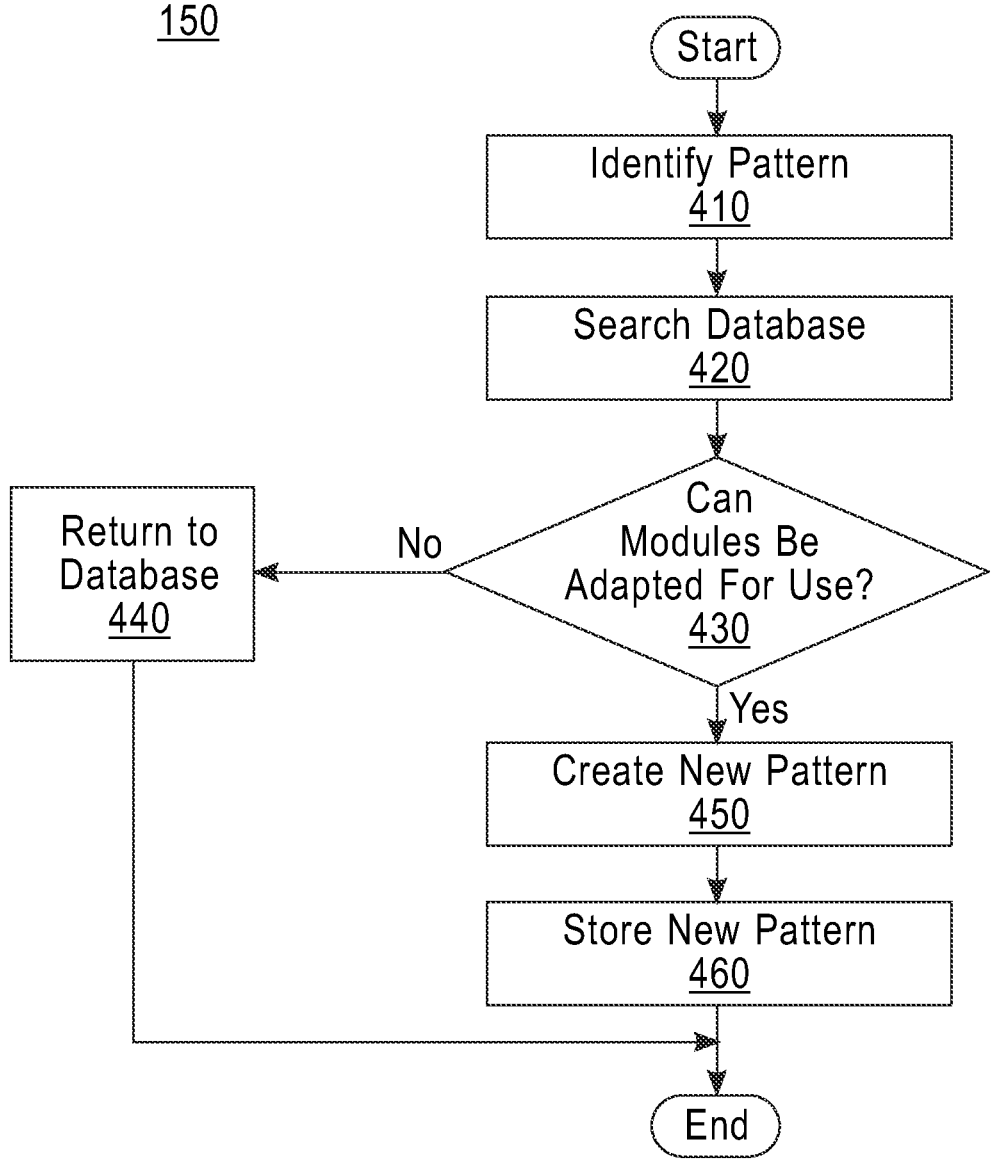
FIG. 4 depicts a flowchart of the steps of a pattern function, executing within the computing system of FIG. 1, for identifying, creating, and storing patterns, in accordance with an embodiment of the present invention.

FIG. 4 depicts a flowchart of the steps of pattern function 150, executing within the computing system of FIG. 1, in accordance with an embodiment of the present invention. Pattern function 150 identifies patterns of use for service module 110 and the appended information and create patterns of use for service module 110 and the appended information, in accordance with one embodiment of the present invention.

In step 410, pattern function 150 identifies patterns of use for service module 110 and the appended information. For example, a pattern may be the manner in which modules in the same category are composed and deployed. These patterns are important to consumers and service providers. For example, for service providers, the patterns can be a way to reduce costs for determining answers or services for every consumer—even if the consumer's need is similar to a previous consumer's need. Furthermore, for consumers, the patterns can be a way to reduce the time in searching for answers or services every time a need for an answer or service arises.

In step 420, pattern function 150 searches service database 160 with one or more patterns of use for service module 110 and of the appended information. Pattern function 150 searches service database 160 for other, previously stored, modules that possess key similarities that may be used in conjunction with the service module 110 and appended information used for searching. In some embodiments, there will be a predefined threshold to determine whether a similarity exists. In other embodiments, the similarities will be determined by iterative learning of a knowledge base.

In decision 430, pattern function 150 searches service database 160 with one or more patterns of module use and determines whether preexisting service module 110-1 through service module 110-n and the appended information can be adapted for use within the parameters of the searched patterns. In one embodiment, the adapted use is in a user defined parameter. In other embodiments, the adapted use is in a provider defined parameter. If service module 110 and the appended information cannot be adapted for use (decision 430, no branch), in the depicted embodiment, pattern function 150 stores service module 110 and the appended information to service database 160 for reconsideration in the future when user provided or provider provided parameters are available (step 440). In other embodiments, pattern function 150 discards service module 110 and the appended information. If service module 110 and the appended information can be adapted for use (decision 430, yes branch), pattern function 150 creates patterns of module use from, in one embodiment, user defined parameters, or from, in another embodiment, provider defined parameters (step 450).

In step 460, pattern function 150 stores the patterns of module use to a repository, such as service database 160. In some embodiments, pattern function may generate one or more reports that include a collection of modules with appended information and patterns of use for said modules with appended information. In other embodiments, pattern function 150 may store the information gathered. Still, in some embodiments, generated reports, or information obtained, are stored to service database 160, for later use by service providers and/or users accessing server 30 through user interface 170 on client computing device 40.

Figure 5:
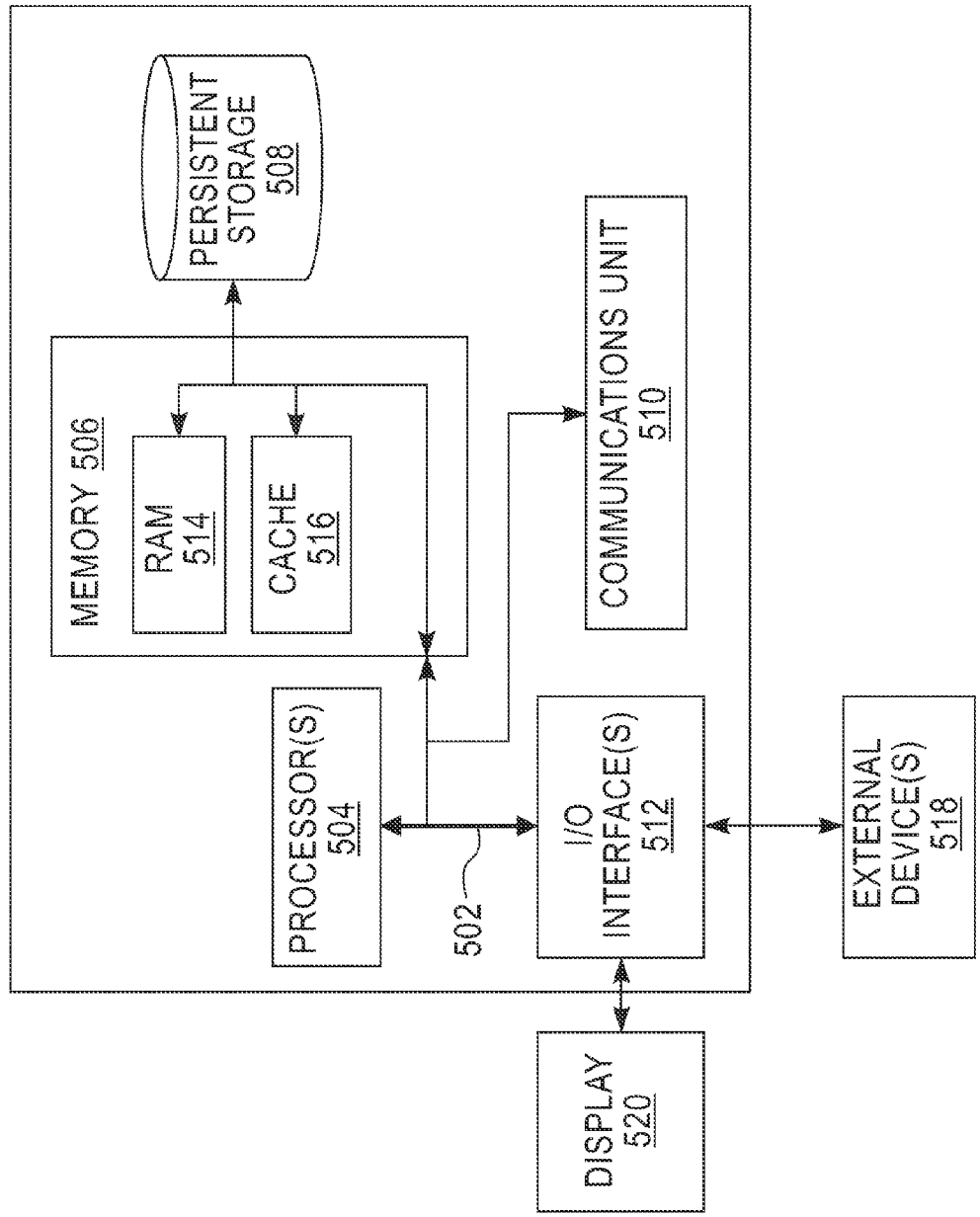
FIG. 5 depicts a block diagram of components of the server or the client computing device, in accordance with an embodiment of the present invention.

FIG. 5 depicts a block diagram of components of server 30 and client computing device 40, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server 30 and client computing device 40 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Service module 110, identifying program 120, storage function 130, implementation function 140, pattern function 150, and service database 160 are stored in persistent storage 508 of server 30 for execution and/or access by one or more of the respective computer processors 504 of server 30 via one or more memories of memory 506 of server 30. User interface 170 is stored in persistent storage 508 of client computing device 40 for execution by one or more of the respective computer processors 504 of client computing device 40 via one or more memories of memory 506 of client computing device 40. In this embodiment, persistent storage 508 includes a magnetic hard disk drive. Alternatively, or in addition to magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Service module 110, identifying program 120, storage function 130, implementation function 140, pattern function 150, and service database 160 may be downloaded to persistent storage 508 of server 30 through communications unit 510 of server 30. User interface 170 may be downloaded to persistent storage 508 of client computing device 40 through communications unit 510 of client computing device 40.

I/O interface(s) 512 allows for input and output of data with other devices that may be connected to server 30 or client computing device 40. For example, I/O interface 512 may provide a connection to external device(s) 518, such as keyboard, keypad, a touch screen, and/or some other suitable input device. External device(s) 518 can also include portable computer readable storage media (e.g., thumb drives, portable optical or magnetic disks, and memory cards). Software and data used to practice embodiments of the present invention, e.g., service module 110, identifying program 120, storage function 130, implementation function 140, pattern function 150, and service database 160, can be stored on such portable computer readable storage media and can be loaded onto persistent storage 508 of server 30 via I/O interface(s) 512 of server 30. Software and data used to practice embodiments of the present invention, e.g., user interface 170, can be stored on such portable computer readable storage media and can be loaded onto persistent storage 508 of client computing device 40 via I/O interface(s) 512 of client computing device 40. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating a service composition, the method comprising:
receiving, by one or more processors, a plurality of software modules, wherein each software module performs part of a service requested by one or more users on a network;
collecting, by one or more processors, one or more attributes and one or more dependencies for each of the plurality of software modules, wherein:
the one or more attributes are information that describe one or more properties of a respective software module and includes one or more of the following: composability, sub-function, dependency type, and composition type; and the one or more dependencies are information that describe one or more reliances of a respective software module and includes one or more of the following: pre-deployment condition, post-deployment condition, composability type, and composability attribute;

appending, by one or more processors, information about the one or more attributes and the one or more dependencies to each respective software module;

storing, by one or more processors, each of the plurality of software modules with the, respective, appended information in a database, wherein the database is a knowledge base, and wherein one or more reports are generated that include a collection of the plurality of software modules with the, respective, appended information; and creating, by one or more processors, a service composition comprised of a combination of the plurality of software modules, based on the appended information and the service requested by the one or more users on the network.

2. The method of claim 1, wherein creating a service composition comprises:

instantiating, by one or more processors, the appended information; and implementing, by one or more processors, the service composition.

3. The method of claim 2, wherein implementing the service composition comprises:

generating, by one or more processors, additional code to allow the plurality of software modules to operate together within a shim implementation support environment.

4. The method of claim 1, further comprising:

identifying, by one or more processors, at least one pattern of software module use and at least one use of the appended information, wherein the at least one pattern is a manner in which software modules in a similar category are previously composed and deployed;

determining, by one or more processors, whether one or more preexisting software modules in the database is adapted for service use, based, at least in part, on the at least one pattern of software module use; and creating, by one or more processors, a pattern of software module use for the database, the pattern including the one or more pre-existing software modules in the database, wherein the pattern is a manner in which software modules in a similar category are previously composed and deployed.

5. A computer program product for creating a service composition, the computer program product comprising:

one or more computer readable storage media and program instructions stored on the one or more computer readable storage media, the program instructions comprising:

program instructions to receive a plurality of software modules, wherein each software module performs part of a service requested by one or more users on a network;

program instructions to collect one or more attributes and one or more dependencies for each of the plurality of software modules, wherein:

the one or more attributes are information that describe one or more properties of a respective software module and includes one or more of the following: composability, sub-function, dependency type, and composition type; and the one or more dependencies are information that describe one or more reliances of a respective software module and includes one or more of the following: pre-deployment condition, post-deployment condition, composability type, and composability attribute;

program instructions to append information about the one or more attributes and the one or more dependencies to each respective software module;

program instructions to store each of the plurality of software modules with the, respective, appended information in a database, wherein the database is a knowledge base, and wherein one or more reports are generated that include a collection of the plurality of software modules with the, respective, appended information; and program instructions to create a service composition comprised of a combination of the plurality of software modules, based on the appended information and the service requested by the one or more users on the network.

6. The computer program product of claim 5, wherein program instructions to create a service composition comprise:

program instructions to instantiate the appended information; and program instructions to implement the service composition.

7. The computer program product of claim 6, wherein program instructions to implement the service composition comprise:

program instructions to generate additional code to allow the plurality of software modules to operate together within a shim implementation support environment.

8. The computer program product of claim 5, further comprising:

program instructions, stored on the one or more computer readable storage media, to identify at least one pattern of software module use and at least one use of the appended information, wherein the at least one pattern is a manner in which software modules in a similar category are previously composed and deployed;

program instructions, stored on the one or more computer readable storage media, to determine whether one or more preexisting software modules in the database is adapted for service use, based, at least in part, on the at least one pattern of software module use; and program instructions, stored on the one or more computer readable storage media, to create a pattern of software module use for the database, the pattern including the one or more preexisting software modules in the database, wherein the pattern is a manner in which software modules in a similar category are previously composed and deployed.

9. A computer system for creating a service composition, the computer system comprising:

one or more computer processors, one or more computer readable storage media, and program instructions stored on the computer readable storage media for execution by at least one of the one or more processors, the program instructions comprising:

program instructions to receive a plurality of software modules, wherein each software module performs part of a service requested by one or more users on a network;

program instructions to collect one or more attributes and one or more dependencies for each of the plurality of software modules, wherein:

the one or more attributes are information that describe one or more properties of a respective software module and includes one or more of the following: composability, sub-function, dependency type, and composition type; and the one or more dependencies are information that describe one or more reliances of a respective software module and includes one or more of the following: pre-deployment condition, post-deployment condition, composability type, and composability attribute;

program instructions to append information about the one or more attributes and the one or more dependencies to each respective software module;

program instructions to store each of the plurality of software modules with the, respective, appended information in a database, wherein the database is a knowledge base, and wherein one or more reports are generated that include a collection of the plurality of software modules with the, respective, appended information; and program instructions to create a service composition comprised of a combination of the plurality of software modules, based on the appended information and the service requested by the one or more users on the network.

10. The computer system of claim 9, wherein program instructions to create a service composition comprise:

program instructions to instantiate the appended information; and program instructions to implement the service composition.

11. The computer system of claim 10, wherein program instructions to implement the service composition comprise:

program instructions to generate additional code to allow the plurality of software modules to operate together within a shim implementation support environment.

12. The computer system of claim 9, further comprising:

program instructions, stored on the computer readable storage media for execution by at least one of the one or more processors, to identify at least one pattern of software module use and at least one use of the appended information, wherein the at least one pattern is a manner in which software modules in a similar category are previously composed and deployed;

program instructions, stored on the computer readable storage media for execution by at least one of the one or more processors, to determine whether one or more preexisting software modules in the database is adapted for service use, based, at least in part, on the at least one pattern of software module use; and program instructions, stored on the computer readable storage media for execution by at least one of the one or more processors, to create a pattern of software module use for the database, the pattern including the one or more preexisting software modules in the database, wherein the pattern is a manner in which software modules in a similar category are previously composed and deployed.

\* \* \* \* \*